US012119987B1

(12) United States Patent
Gantt et al.

(10) Patent No.: US 12,119,987 B1
(45) Date of Patent: Oct. 15, 2024

(54) LAYER-SPECIFIC MODIFICATIONS TO NETWORK COMMUNICATIONS ACCORDING TO CONFIGURABLE RULES AT A PROXY

(71) Applicant: Amazon Technologies, Inc., Seattle, WA (US)

(72) Inventors: Ryan Preston Gantt, Seattle, WA (US); Ethan F. John, Seattle, WA (US); Jacob Shannan Carr, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 849 days.

(21) Appl. No.: 16/414,685

(22) Filed: May 16, 2019

(51) Int. Cl.
*H04L 41/0813* (2022.01)
*H04L 67/56* (2022.01)

(52) U.S. Cl.
CPC .......... *H04L 41/0813* (2013.01); *H04L 67/56* (2022.05)

(58) Field of Classification Search
CPC ............................ H04L 41/0813; H04L 67/56
USPC .......................................................... 709/220
See application file for complete search history.

(56) References Cited

U.S. PATENT DOCUMENTS

| | | | | |
|---|---|---|---|---|
| 8,316,447 B2* | 11/2012 | Guruswamy | ......... | G06F 21/577 |
| | | | | 726/25 |
| 8,527,622 B2 | 9/2013 | Moreira Sa de Souza | | |
| 8,547,974 B1* | 10/2013 | Guruswamy | ......... | H04L 43/026 |
| | | | | 370/395.5 |
| 9,660,998 B1* | 5/2017 | Sethi | ....................... | H04L 63/08 |
| 9,842,045 B2 | 12/2017 | Heorhiadi et al. | | |
| 2010/0250932 A1* | 9/2010 | Dill | ......................... | H04L 51/00 |
| | | | | 713/168 |
| 2015/0156223 A1* | 6/2015 | Xu | ......................... | H04L 67/141 |
| | | | | 709/227 |
| 2017/0060715 A1* | 3/2017 | Ye | ......................... | G06F 11/263 |
| 2017/0242784 A1* | 8/2017 | Heorhiadi | .......... | G06F 11/3684 |
| 2018/0039565 A1* | 2/2018 | Rajagopalan | ....... | G06F 11/3476 |

OTHER PUBLICATIONS

Vijayananda et al., Validation of an OSI Stack Implementation using Fault-Injection, Apr. 15, 1994, pp. 46-53 (Year: 1994).*
"What is Envoy", Retrieved from https://www.envoyproxy.io/docs/envoy/latest/intro/what_is_envoy, © Copyright 2016-2019, Envoy Project Authors, p. 1-3.

* cited by examiner

*Primary Examiner* — Philip C Lee
(74) *Attorney, Agent, or Firm* — S. Scott Foster; Kowert, Hood, Munyon, Rankin & Goetzel, P.C.

(57) ABSTRACT

Layer-specific modifications may be applied to a network communication received at a proxy according to configurable rules at the proxy. A modification configuration may be received at the proxy that corresponds to a layer of a communication stack supported by the proxy. When a communication is received, data from the layer of the communication stack of the network communication may be evaluated to determine whether a modification is applicable to the communication according to the modification configuration. An applicable modification may be applied by proxy as part of processing the communication at the proxy.

20 Claims, 9 Drawing Sheets

LAYER-SPECIFIC MODIFICATIONS TO NETWORK COMMUNICATIONS ACCORDING TO CONFIGURABLE RULES AT A PROXY

BACKGROUND

Network-based applications are increasingly implemented in complex, widely distributed environments which may rely upon the performance multiple different systems in order to offer performant solutions and services. Because network-based applications are designed to avoid failure, stress, or other undesirable scenarios, unexpected problems caused by or otherwise related to the interdependency of various systems of a network-based application may remain undetected even utilizing the most robust testing and evaluation techniques. Therefore, techniques that increase the ability to detect and correct additional, and potentially catastrophic failure scenarios, are highly valuable to increase the performance and resiliency of network-based applications.

Figure 1:
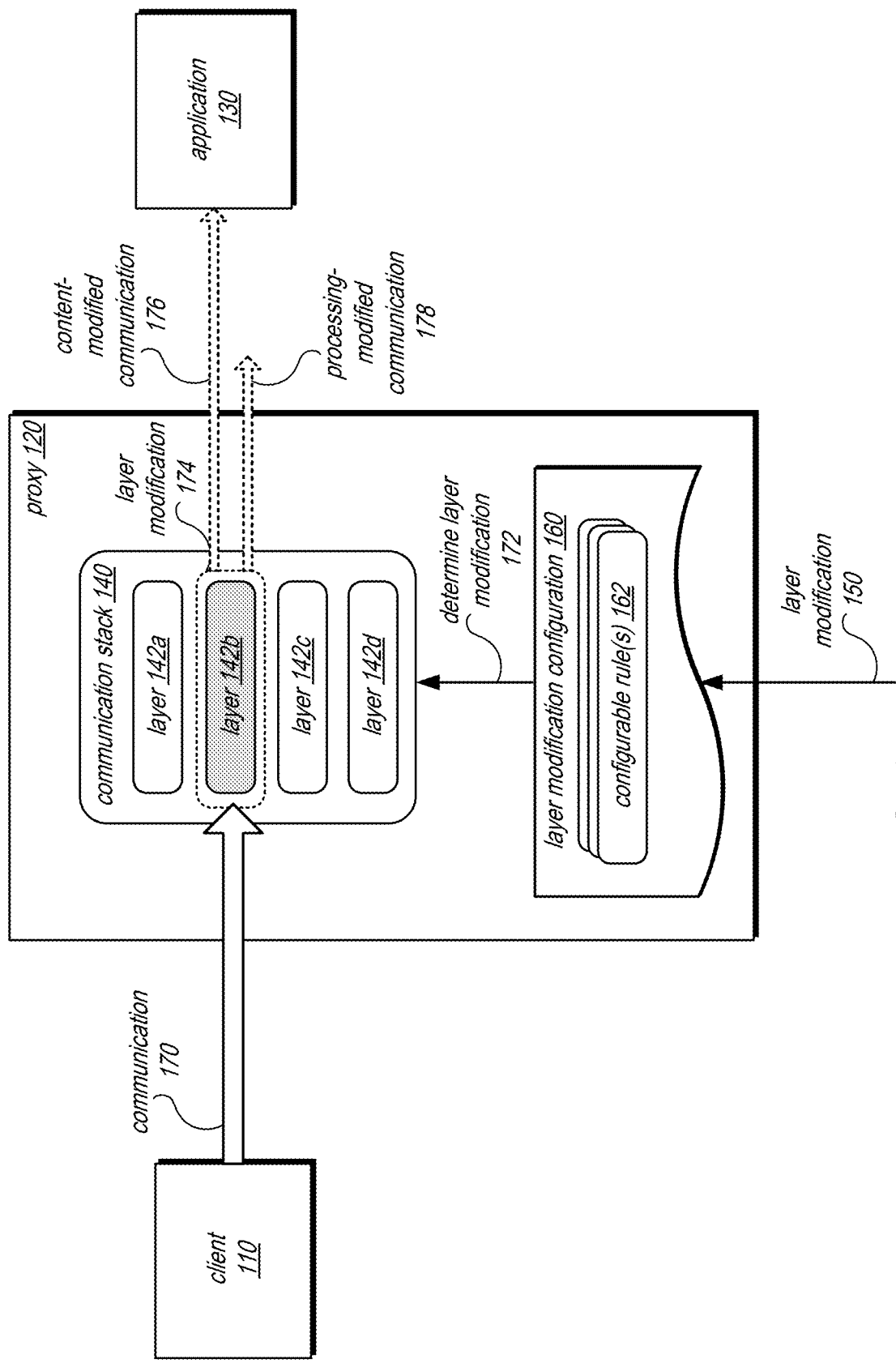
FIG. 1 is a logical block diagram illustrating layer-specific modifications to network communications according to configurable rules at a proxy, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Techniques to implement layer-specific modifications to network communications according to configurable rules at a proxy are described herein. Network-based application performance may depend upon numerous factors outside of the application's immediate control, including the performance of network communications with the application as well as dependencies on other applications, services, or clients to perform network communications. Network application owners, managers, or developers, can utilize a proxy between, for instance, a well-known Internet name (e.g. a network endpoint, a programmatic interface service, or a load balancer) and application server. The proxy can implement a layer-specific modification configuration to determine how individual communications will be degraded, failed, or proxied to a recipient. A layer-specific modification configuration may be statically defined or dynamic (e.g., to simulate temporary degradation during an outage, network failure, or datacenter failure simulation).

Common failure modes that may be implemented by layer-specific modification by a proxy may include layer-specific failures (e.g., application-protocol failures) like retries, timeouts, client and server errors. Other modifications can include additional latency, message loss or corruption, or proxy-defined failures. Layer-specific proxy modifications of communications can allow for transparent implementation of modification techniques (e.g., on behalf of serverless application owners, for example, by proxying and degrading requests between a programmatic interface service or load balancer and a back end application that executes business logic). Moreover, such transparency can incur no interruption to their service and require no changes from them or their clients, in some embodiments.

Because complex network-based systems often include many different dependencies (and upon systems not always under the control of an application developer) some failure scenarios cannot be captured and corrected until they occur when a system is deployed and in service. As one skilled in the art will appreciate in light of this disclosure, certain embodiments may be capable of achieving certain advantages, including provoking difficult to discover failure scenarios, problem scenarios, or other interdependent system errors (e.g., with regard to computing speed by introducing latency, with regard to network reliability by dropping or modifying communication content, and so on) without modifying clients or applications to produce the system errors—which would otherwise have to be modified in order to manually produce the system errors. Instead, in various embodiments failures can be identified and corrected as result of more rigorous evaluation of systems before occurring in a deployed system, improving the performance of clients and applications by increasing resiliency to withstand different problematic scenarios that would not have otherwise been identified.

FIG. 1 is a logical block diagram illustrating layer-specific modifications to network communications according to configurable rules at a proxy, according to some embodiments. Client 110 can send a communication 170 (e.g., an application request) to be transmitted to application 130 or other destination as discussed below. Proxy 120 may be implemented to intercept and thus receive communication 170

(e.g., according to various configurations such as those discussed below with regard to FIGS. 3A-4) and dynamically perform a modification 174 on a layer, such as layer 142b, of a communication stack 140. Communication stack 140 can be a TCP/IP protocol stack, or other stack of communication protocols or other communication layer types (e.g., implemented according to an OSI model), such as layers 142a, 142b, 142c, and 142d, which may include application-specific layers.

Proxy 120 may read, decode, extract, parse, or otherwise obtain some or all content of a communication at a layer of communication stack 140 and evaluate the content according to layer modification configuration 160 to determine whether a modification 174 is applicable to communication 170. Because layer modification configurations 160 are configurable and may be changed, updated, or replaced, the determination and application of layer modifications 174 may be dynamic. For instance, different modifications (or no modifications) can be determined for the same layer of different communications (e.g., one communication can be dropped while another communication can be forwarded to an incorrect destination).

Layer modification configuration 160 may be stored, uploaded, configured or created 150 and may include one or multiple configurable rule(s) 162. These rules 162 may describe various modifications, as well as scenarios for modifying a communication (e.g., as discussed below with regard to FIGS. 5, 6, 7 and 8), which can, in some embodiments, be evaluated at run-time when a communication is received. Layer modification configuration 160 can implement or apply different types or classes of modifications to be performed, including modifications to the processing of a communication (e.g., a termination, failure, or misdirected communication 178) or a communication with modified content 176 at the layer before being sent to application 130.

Please note that previous descriptions are not intended to be limiting, but are merely provided as examples of proxies, clients, applications, communications tacks, layer modification configurations, and communications. Various other implementations of these features, such as other types of destinations or modifications at different layers of a communication stack including those discussed below, may implement the techniques discussed above.

This specification next includes a general description of a provider network, which may include a proxy modification service that implements proxies that perform layer-specific modifications to communications according to configurable rules. Then various examples of the proxy modification service and proxies are discussed, including different components, or arrangements of components that may be employed as part of implementing a proxy modification service. A number of different methods and techniques to implement layer-specific modifications to network communications according to configurable rules at a proxy are then discussed, some of which are illustrated in accompanying flowcharts. Finally, a description of an example computing system upon which the various components, systems, devices, and/or nodes may be implemented is provided. Various examples are provided throughout the specification.

Figure 2:
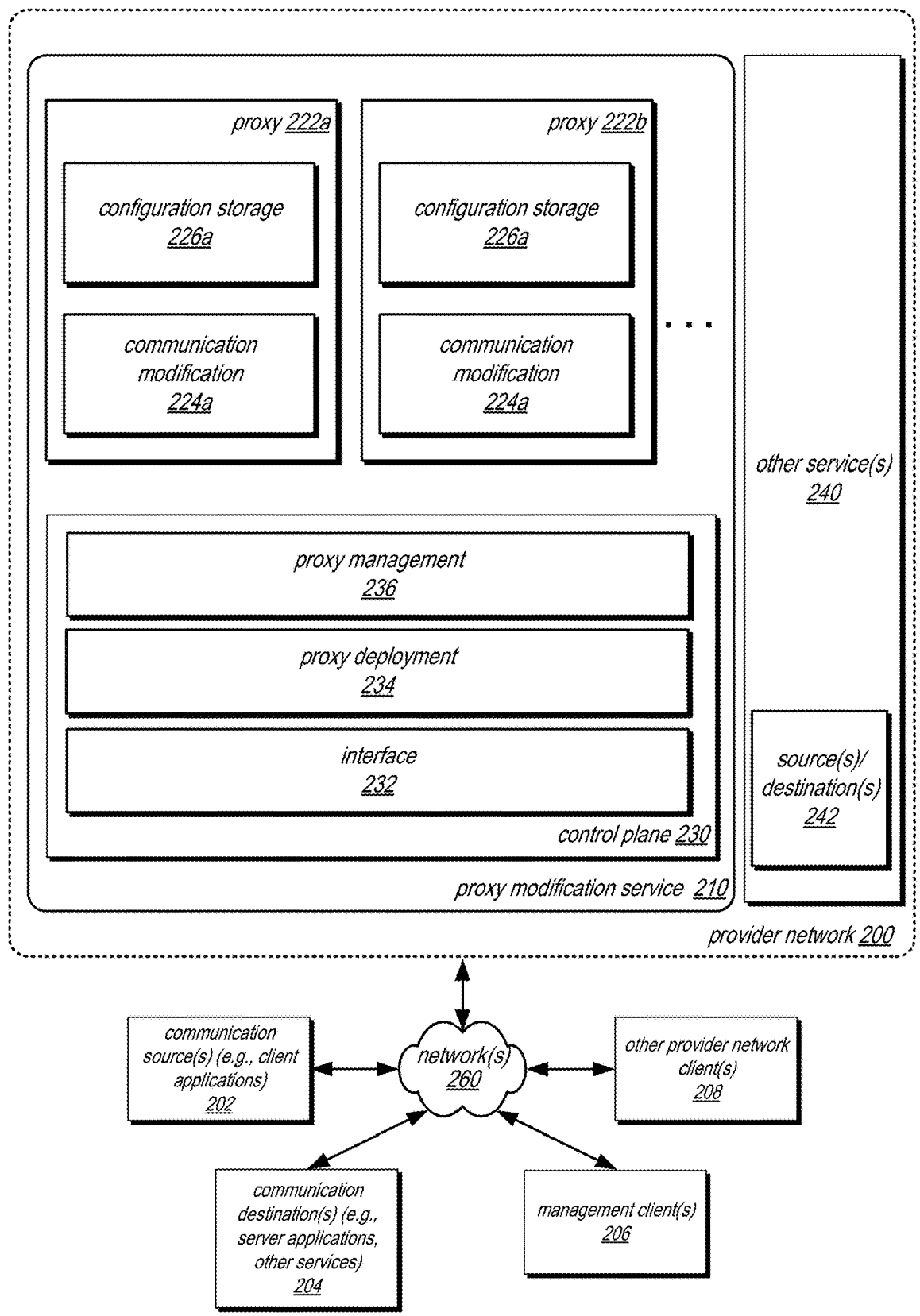
FIG. 2 is a logical block diagram illustrating a provider network that includes a proxy modification service, according to some embodiments.

FIG. 2 is a logical block diagram illustrating a provider network that includes a proxy modification service, according to some embodiments. Provider network 200 may be a private or closed system or may be set up by an entity such as a company or a public sector organization to provide one or more services (such as various types of cloud-based storage, cloud-based commerce, transaction, or fulfillment platforms) accessible via the Internet and/or other networks to clients. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may implement a proxy modification service 210 as well as various other services 240, such as database service(s), (e.g., a map reduce service, a data warehouse service, relational database services, non-relational database services (e.g., NoSQL) and other database services), data processing services (e.g., virtual compute services or event-driven compute services), e-commerce service platforms, and data storage services (e.g., object storage services or block-based storage services that may implement a centralized data store for various types of data), programmatic interface service 324 discussed in FIG. 3, and/or any other type of network based services (which may various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below (e.g., a host server that implements one (or more) nodes of a service). In various embodiments, the functionality of a given system or service component (e.g., a component of proxy modification service 210 or other service(s) 240) may be implemented by a particular node or may be distributed across several nodes. In some embodiments, a given node may implement the functionality of more than one service system component (e.g., more than one control plane 230 component).

In various embodiments, proxy modification service 210 may deploy proxies, such as proxies 222a and 22b in various configurations or scenarios, as discussed below with regard to FIGS. 3A-4, to perform modifications to network communications in order to provoke or create various conditions or scenarios, as discussed above with regard to FIG. 1. Proxy modification service 210 may implement control plane 230 which may implement various internal management and service control features as well as support user management and configuration. For example, control plane 230 may implement an interface, such as interface 232, which may be a graphical user interface (GUI) hosted on a web site or other control panel, command line interface, and/or programmatic interface (e.g., Application Programming Interfaces (APIs)) to support different features, such as those discussed below with regard to FIG. 6. For example, interface 232 may dispatch requests to deploy a proxy, update a layer-specific modification configuration, or other proxy management requests.

Control plane 230 may implement proxy management 236, in some embodiments, in order to monitor the health and/or performance of proxies 222. For example, proxy management 236 may perform operations to provision additional proxy servers or networking devices for subsequent deployment, move layer-specific proxy modifications to another proxy, repair proxies, update proxies (e.g., via software patches), or otherwise handle failure or performance events to ensure that a minimum service level (e.g., as may be specified in a Service Level Agreement (SLA)) is met by proxies 222 for users.

Control plane 230 may implement proxy deployment 234, in some embodiments. For example, proxy deployment 234 may cause installation, creation, shutdown, update, or other processes or workflows to be performed on host systems 1000 of a proxy 222 by sending instructions, data, executables, and/or other information to complete the processes or workflows.

Proxies 222 may be a virtual server (e.g., a proxy server virtual machine hosted on a computing system 1000 as part of virtual compute resources offered by another service 240 of provider network 200), or as physical server to implement proxy techniques or a networking device that implements a proxy, as discussed below with regard to FIG. 4. Proxies 222 may implement communication, such as communication modification 224a and 224b, which may apply modifications to communications according to the techniques discussed above with regard to FIG. 1 and below with regard to FIGS. 5, 7, and 8.

Proxies 222 may implement configuration storage, such as configuration storage 226a and 226b, which may be a local (or remote) data store that stores configuration data applied to perform communication modifications at the respective proxy.

Figure 7:
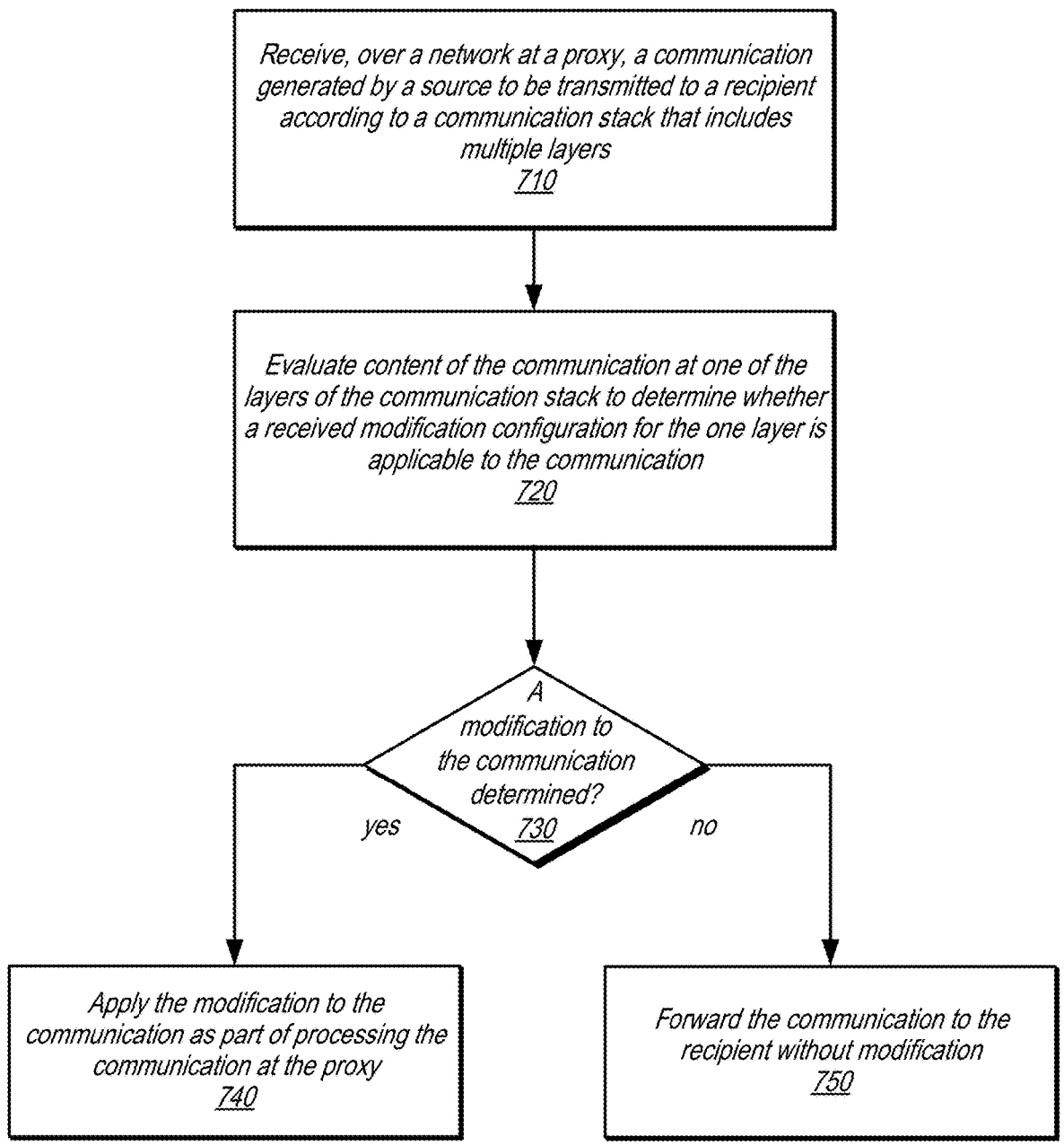
FIG. 7 is a high-level flowchart illustrating various methods and techniques that implement layer-specific modifications to network communications according to configurable rules at a proxy, according to some embodiments.

Clients of provider network 200 may encompass any type of client configurable to submit requests to provider network 200, and thus may be sources 202 or destinations 204 for communications as discussed below with regard to FIG. 7. For example, a communication source 202 may include a suitable version of a web browser, or may include a plug-in module or other type of code module configured to execute as an extension to or within an execution environment provided by a web browser, or another client application (e.g., an application hosted in another provider network or private network) that uses or is dependent upon communications sent to some resource provider network 200 (e.g., a destination 242 in other services 240), such as a web application (or user interface thereof) that utilizes a provider network resource or application, such as a media application, an office application or any other application that may make use of various provider network resources, including to perform various operations. In some embodiments, such an application may include sufficient protocol support (e.g., for DNS protocol or for a suitable version of Hypertext Transfer Protocol (HTTP)) for generating and processing network-based services requests. In some embodiments, clients (e.g., sources 202, management clients 206, and other provider network client(s) 208) may be configured to generate network-based services requests according to a Representational State Transfer (REST)-style network-based services architecture, a document- or message-based network-based services architecture, or another suitable network-based services architecture. In some embodiments, a management client 206 may be configured to provide access to a control plane to manage resources, including proxies via interface 232 to control plane 230 of proxy modification resource. Clients may be associated with particular user accounts, user identifiers, or other information which may indicate the access rights, resources, and other associated information maintained at provider network 200 that implements resources in multi-tenant fashion on behalf of a client. In some embodiments, sources and destinations of a communication (e.g., a client and application) of may be both implemented within provider network 200 (e.g., an object storage service of provider network 200 may utilize a data processing service to format data before storage within the object storage service) to implement various service features or functions and thus various features of clients discussed above may be applicable to such internal clients as well.

Clients may convey network-based services requests to provider network 200 via network(s) 260. In various embodiments, network(s) 260 may encompass any suitable combination of networking hardware and protocols necessary to establish network-based communications between clients 202 and provider network 200. For example, network(s) 260 may generally encompass the various telecommunications networks and service providers that collectively implement the Internet. A network(s) 260 may also include private networks such as local area networks (LANs) or wide area networks (WANs) as well as public or private wireless networks. For example, both a given communication source 202 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and provider network 200. It is noted that in some embodiments, clients may communicate with provider network 200 using a private network rather than the public Internet.

Figure 3A:
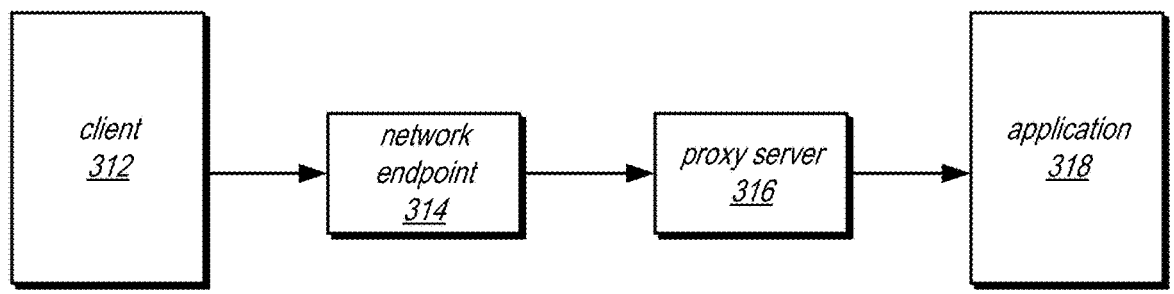
FIGS. 3A-3C are logical block diagrams illustrating different deployments of a proxy server, according to some embodiments.
Figure 3B:
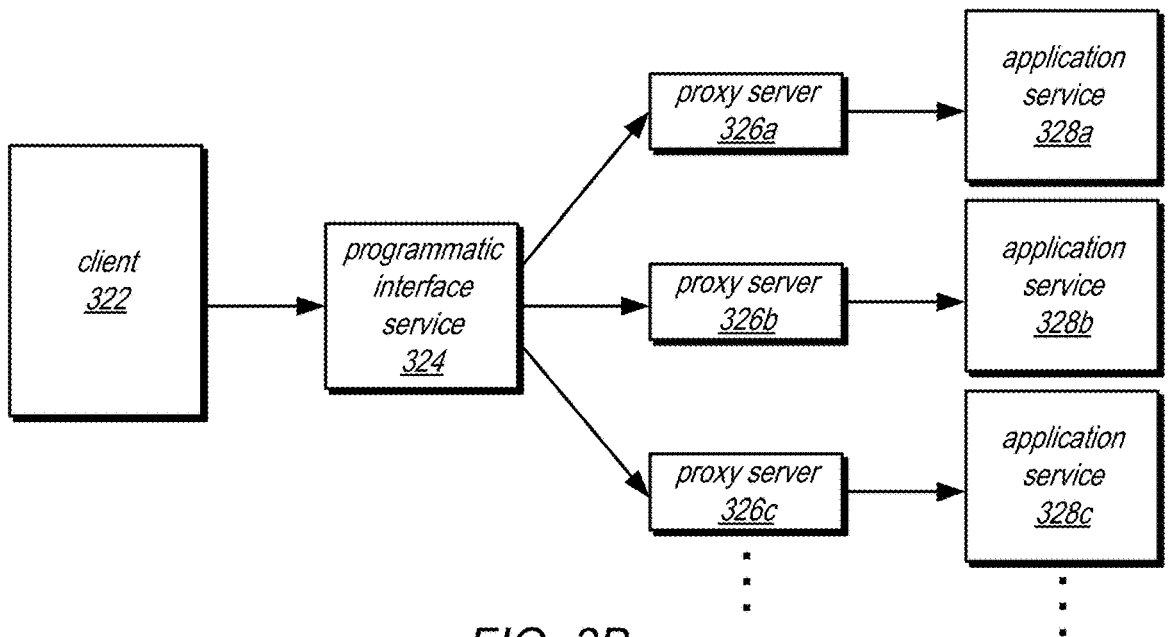
Figure 3C:
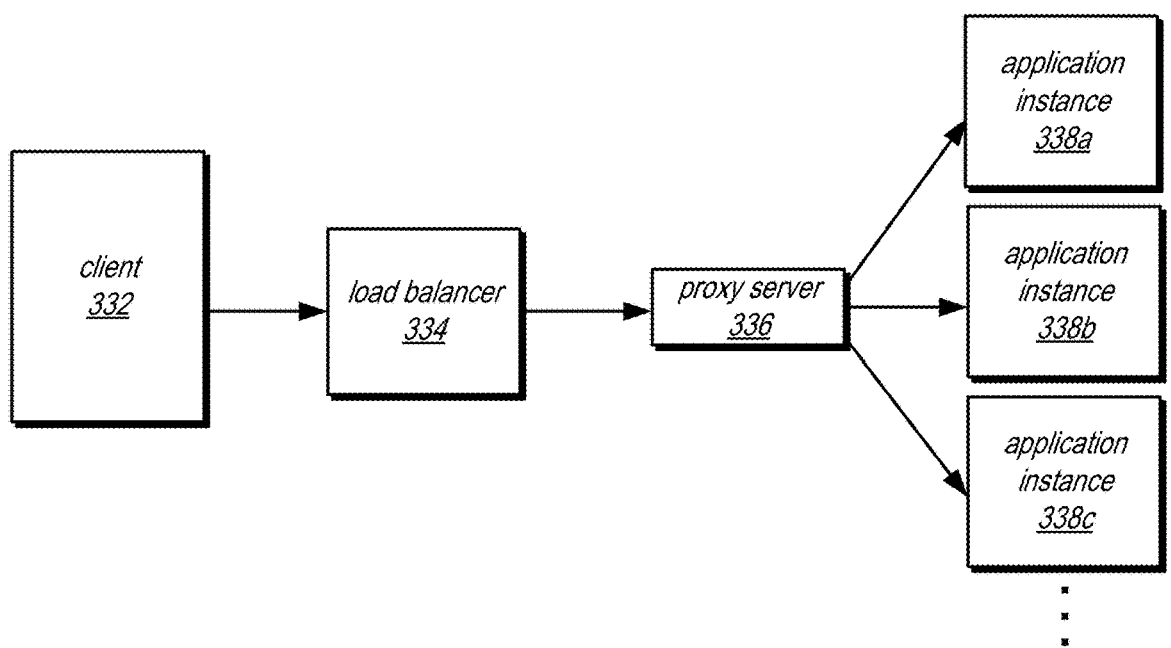

FIGS. 3A-3C are logical block diagrams illustrating different deployments of a proxy server, according to some embodiments. In FIG. 3A, a proxy may be deployed as a proxy server 316 behind a network endpoint 314. Network endpoint 314 may be a virtual or elastic network address that may be dynamically updated to point to different instances of an application 318. In this way, client 312 (or other communication source) may direct requests to network endpoint 314 that are bound for a particular application 318. However, if application 318 were to fail, a backup or failover application implemented at another host system within provider network 200 (not illustrated) could assume the work of application 318 and automatically receive traffic directed to network endpoint 314. Deploying proxy server 316 between network endpoint 314 and application 318 may allow for layer-specific modifications performed by proxy server 316 to shift automatically when network endpoint 314 is assigned to a different application.

In FIG. 3B, proxy servers, such as proxy server 326a, 326b, and 326c may be deployed between a programmatic interface service 324 and different application services, such as application service 328a, 328b, and 328c. Programmatic interface service 324 may dispatch different supported API requests from client 322 (or other source) to different services that implement or otherwise handle the request received at the programmatic interface service 324. For example, certain API requests may be handled by a database service, so programmatic interface service 324 may dispatch the request (or a request to accomplish on the request) to the database service. In some embodiments, programmatic interface service 324 may support proxy server routing configurations or rules to select a proxy server 326 to route a request to. For example, different selection schemes, such as round robin or weighted round robin, shuffle sharding may be requested when a proxy deployment or configuration request is received (e.g., discussed below with regard to FIG. 6) which may also cause an update to programmatic interface service 324.

Proxy servers 326 may be deployed between programmatic interface service 324 and application services 328. In this way, the modifications performed by proxy servers 326 can be performed transparently for particular APIs that are directed to an application service by programmatic interface service 324 (as opposed to requests sent directly to an applications service by another client (not illustrated)).

In FIG. 3C, a proxy server 336 may be deployed between a load balancer 334 and application instances 338a, 338b, and 338c. In this way, client 332 requests distributed by load balancers to application instances 338 can be modified to provoke various conditions or scenarios directed by load balancer 334 (and without modification to client 332 or application instances 338). For example, proxy server 336 can modify requests to randomly make application instance 338c appear to be failed (even though it may not be) to understand how quickly a load balancer 334 can detect or adjust the load balancing scheme to account for the failure (or that it does not).

Figure 4:
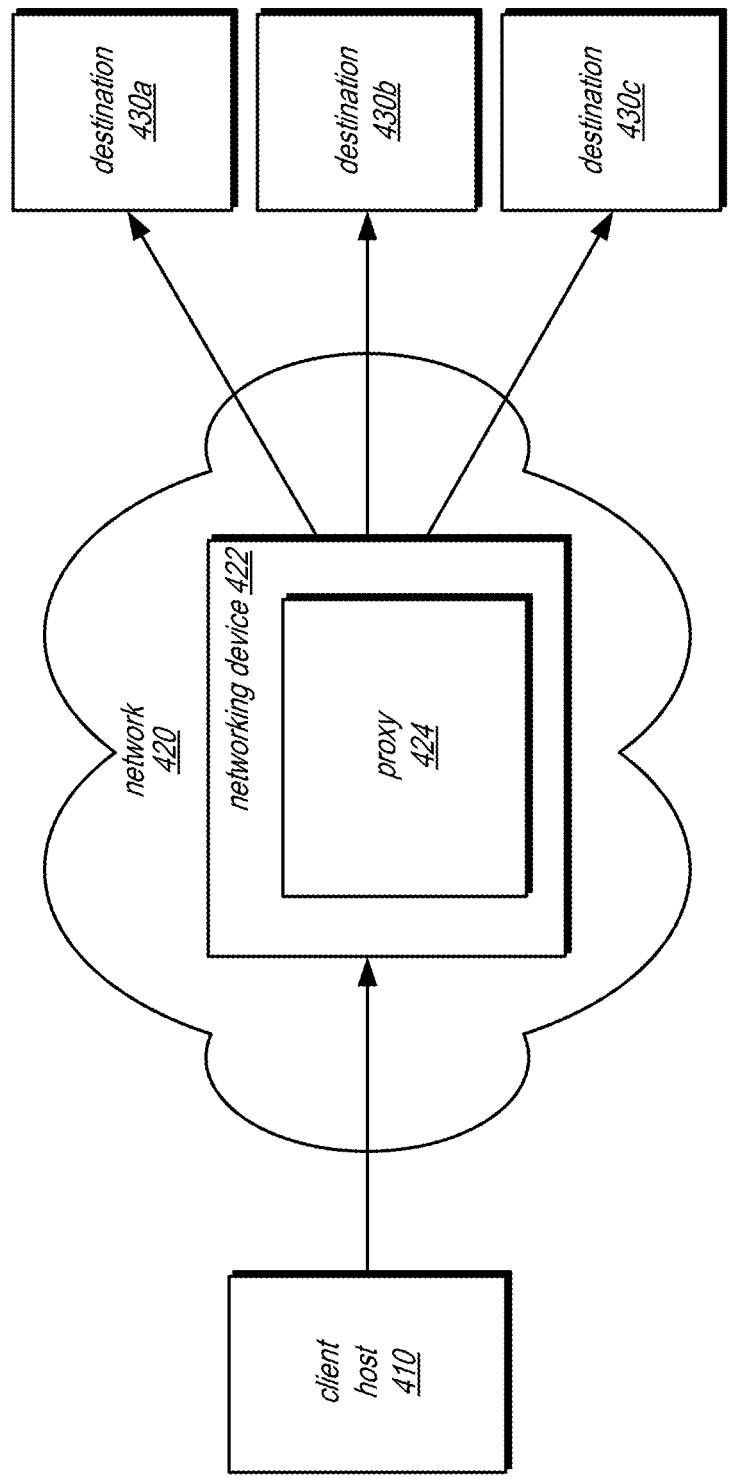
FIG. 4 is a logical block diagram illustrating deployment of a proxy at a networking device, according to some embodiments.

FIG. 4 is a logical block diagram illustrating deployment of a proxy at a networking device, according to some embodiments. Networking device 422 may be implemented as part of network 420 (e.g., part of provider network 200 to support traffic between services and external clients or systems). Networking device 422 may be router, firewall, load balancer, switch or other networking device that facilitates network traffic in network 420. Proxy 424 may be implemented according to software (e.g., on a processor implementing an operating system like system 1000 in FIG. 9), firmware running directly on a processor and/or other hardware, dedicated circuitry (e.g., a System-on-a Chip (SOC)) or some combination thereof in addition to components that perform the other features of the networking device (e.g., routing processing, load balancing, etc.). In some embodiments. proxy 424 may be implemented in a peripheral device that is connected to an interface or port of networking device 422 (e.g., a PCI slot) or as part of a network interface card (NIC).

Client host 410 may send communications that may be intercepted by proxy 424 when forwarded to networking device 422 as part of being transmitted in network 420 to one or multiple destinations, 430a, 430b, and 430c (e.g., a network interface card that receives requests for an application hosted at a computer system 1000 that implements the network interface card). In some embodiments, the layers of a communication stack visible to proxy 424 may be dependent upon the deployment of the proxy (e.g., at a networking device, lower layer information may be visible).

Figure 5:
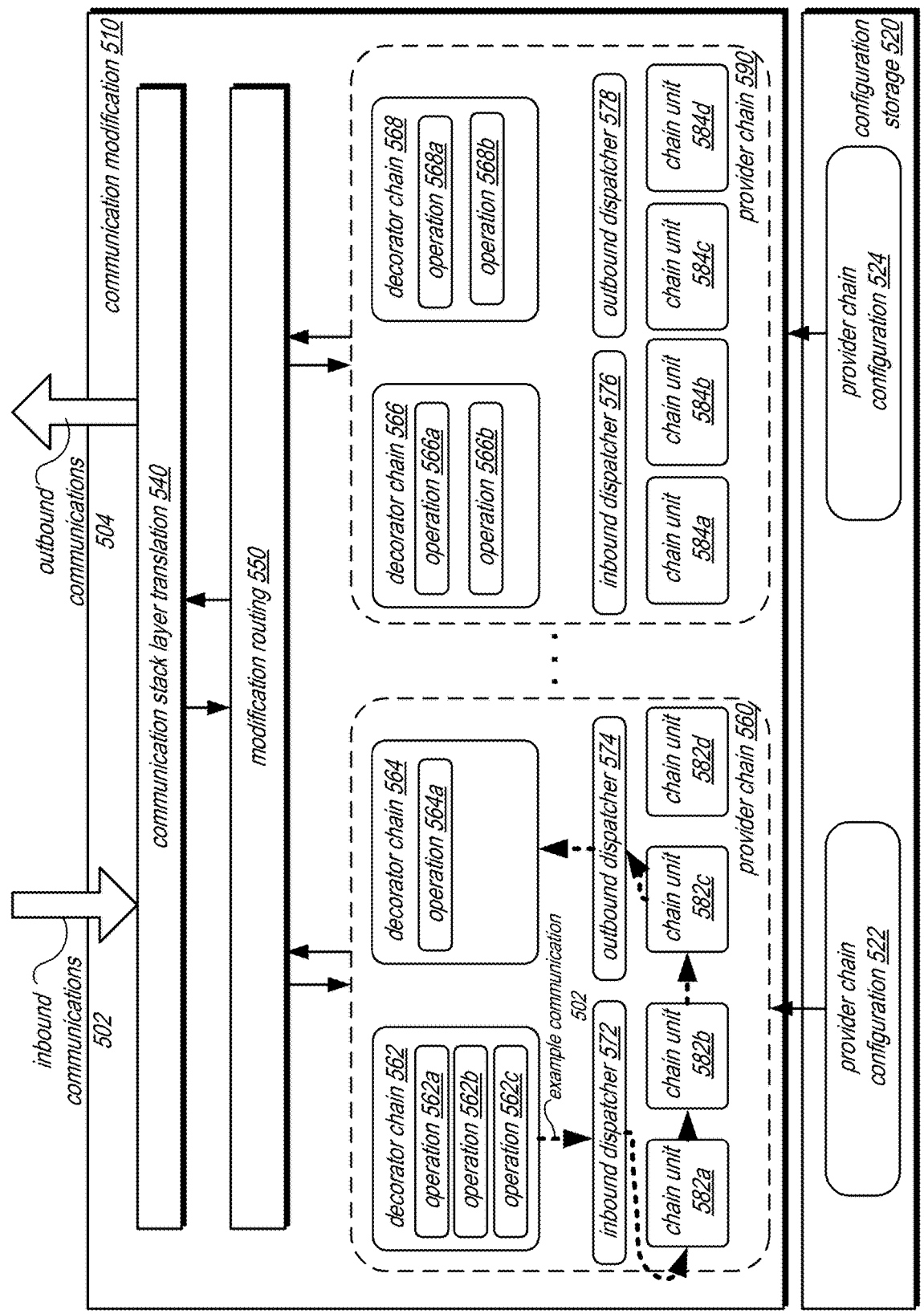
FIG. 5 is a logical block diagram illustrating communication modification at a proxy, according to some embodiments.

FIG. 5 is a logical block diagram illustrating communication modification at a proxy, according to some embodiments. Communication modification 510 may implement communication stack layer translation 540 to parse and/or decode inbound communications 502 so that the layer specific information may be made accessible for determining whether a modification to a layer is to be made. In at least some embodiments, communication stack layer translation 540 may be unable to translate encrypted or otherwise secured data in a communication, which may be ignored for purposes of identifying a modification.

Figure 6:
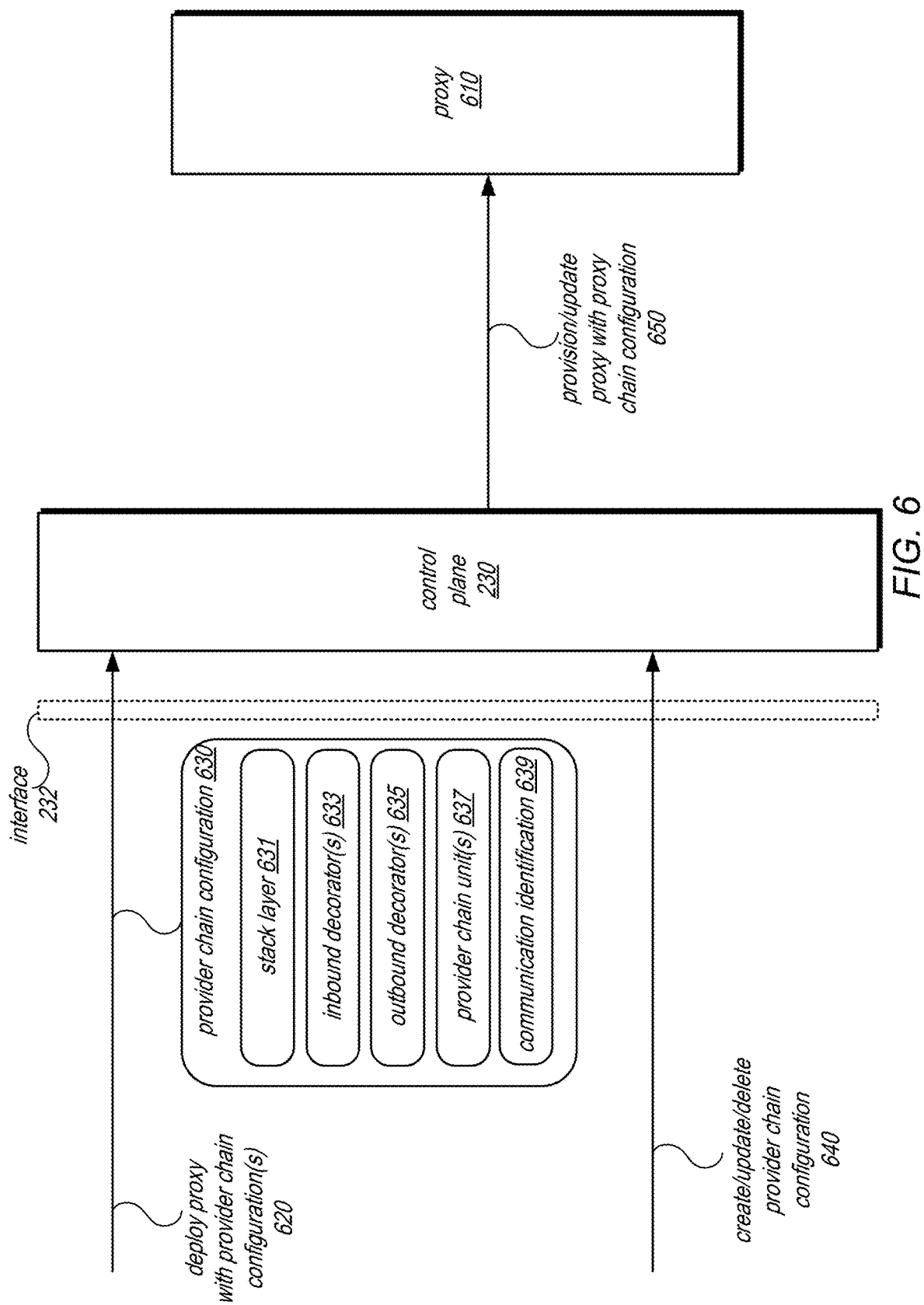
FIG. 6 is a logical block diagram illustrating interactions to configure layer-specific modifications to network communications at a proxy deployed by a proxy modification service, according to some embodiments.

Communication modification 510 may implement modification routing 550, which may apply communication identification criteria for selecting a provider chain 560 for evaluating the communication (e.g., communication identification criteria 639 in FIG. 6). For example, modification routing may route a communication to a provider chain 560 (as indicated by the dotted line arrows in example communication 502) which may perform modification(s) to the communication for a layer specific to provider chain 560. A decorator chain 562 of operations, 562a, 562b, and 562c, may operate upon the inbound communication 502 to perform content modifications to the communication (e.g., as may be defined in rules identified in provider chain configuration 522) before inbound dispatcher 572 provides the communication 502 to a first provider chain unit 582a, of the provider chain units 582a, 582b, 582c, and 582d of provider chain 560.

Provider chain units may, in some embodiments, make modification processing decisions according to rules identified in provider chain configuration 522. For example, whether to direct a communication to a next chain unit may be determined according to one or more random number criteria evaluation, a percentage based selection technique, or evaluations of layer content in the communication. As noted below, different processing modifications, including delay, dropping, and failure (or forwarding without modification) may be determined by a chain unit, and the last chain unit stage to handle a communication (e.g., chain unit 582c for example communication 502 in FIG. 5) may provide the data of the layer in the communication to outbound dispatcher 574 to perform those operations (e.g., 564a) in an outbound decorator chain 564 to complete the determined modification(s). Modification routing 550 may then return the layer data in the communication as appropriate to communication stack layer translation 540 to incorporate the modification into an outbound communication 504 (or to send a different response, such as a failure response).

A proxy may apply multiple different provider chains (e.g., to different communications at the same or different layers in a communication stack) and in some cases may apply multiple provider chains to a same communication (e.g., as directed by the logic described in each chain unit). Each provider chain may be configured differently. For example, provider chain configuration 524 in configuration storage 520 may define provider chain 590 differently than provider chain 560. For example, inbound decorator chain 566 may include two operations 566a and 566b, inbound dispatcher 576 may direct the communication to a chain of two chain units 584a and 584b. Outbound dispatcher 578 may direct a communication to an outbound decorator chain 568 of two units 568a and 568b.

Please note that the illustrated examples of provider chains are provided for exemplary purposes only and are not intended to be limiting as to other provider chain configurations.

FIG. 6 is a logical block diagram illustrating interactions to configure layer-specific modifications to network communications at a proxy deployed by a proxy modification service, according to some embodiments. Control plane 230 may handle management requests received via interface 232 and dispatch or perform appropriate actions with regard to the appropriate proxy, as illustrated in FIG. 6. In other embodiments, a management interface (not illustrated) may be implemented at a proxy so that updates to layer modification configurations, for instance, can be directly communicated to the proxy.

As indicated at 620, a request to deploy a proxy may be received at control plane 230 via interface 232. The request may be a request to deploy proxy 610 in the various circumstances or configurations discussed above with regard to FIGS. 3 and 4, such as a request to deploy the proxy behind a load balancer, network endpoint, programmatic interface service or at a networking device.

As part of the deployment request, a provider chain configuration 630 may be provided. Provider chain configuration 630 may include the various features to apply rules of a layer-specific modification configuration to communications, at least some of which may correspond to different components of the provider chain (as discussed above with regard to FIG. 5). For example, provider chain configuration may include a stack layer identifier 631 (e.g., application, network, transport, etc.), inbound decorator(s) 633, outbound decorators, and provider chain unit(s) 637. In some embodiments, communication identification criteria 639 may be included to identify which communications are subject to the provider chain configuration (e.g., for modification routing), in some embodiments (although such criteria could be implemented as part of provider chain units). Provider chain configuration 630 may be specified as document-based object (e.g., JavaScript Object Notation (JSON), extended markup language (XML), or other human readable object), in some embodiments. For example, a JSON document could describe a provider chain, identify the various decorators and provider chain units, and specify the inputs, outputs, and modifications or operations (e.g., how to evaluate and/or modify the layer content of a communication according to various logical operators, modification operators, comparison operators, etc.) performed by each feature of the provider chain (e.g., inbound decorator 1 modifies X field, inbound decorator 2 receives as input communication data from decorator 1, and so on). In other embodiments, provider chain configuration 630 may be specified according to one or more parameters, flags, criteria, or other features of an application programming interface (API) request. By implementing provider chain configurations with configurable features, various dynamically determined modifications can be specified within a single provider chain, in some embodiments. For example, a single provider chain can delay some communications, modify content of some communications, and/or forward unmodified different communications evaluated by the same provider chain.

Control plane 230 may parse the deployment request 230 to identify where to deploy proxy 610 and how to configure proxy 610 including provider chain configuration(s) to be applied. For example, control plane 230 may initiate a deployment workflow that identifies an available proxy server, provisions the proxy server, sends to the proxy server the provider chain configuration 630, established or configures the network connections between the proxy server, application, and other communication participants, systems, or devices, among other actions. As discussed above with regard to FIG. 3B, in scenarios where multiple proxies are deployed, a routing policy or other scheme for selecting which proxy is to receive traffic may be specified and implemented (e.g., at a load balancer, programmatic interface, etc.) as part of performing actions to deploy the proxy. Control plane 230 may provision or update the proxy with the proxy chain configuration accordingly, as indicated at 650.

In addition to deployment requests, interface 232 may support individual requests to create, update, and/or delete a provider chain configuration, as indicated at 640, at proxy 610. For example, an API to update or change a rule of a modification configuration (e.g., at a feature of a provider chain such as a decorator and/or provider chain unit) may be received. Similarly, a new version of the provider chain configuration document may be received in order to replace a current version of provider chain configuration 630, in some embodiments.

The examples of layer-specific modifications to network communications according to configurable rules at a proxy as discussed above with regard to FIGS. 2-6 have been given in regard to proxy modification service offered by a provider network. Various other types or configurations of proxy systems or devices that can intervene between sources and recipients may implement these techniques. FIG. 7 is high-level flowchart illustrating various methods and techniques that implement layer-specific modifications to network communications according to configurable rules at a proxy, according to some embodiments. Various ones of the systems described above may implement some or all of these techniques, as well as other systems not illustrated above.

As indicated at 710, a communication generated by a source to be transmitted to a recipient according to a communication stack that includes multiple layers may be received over a network at a proxy, in some embodiments. For example, the communication may be a request, command, instruction, response, or other information exchanged between the source and recipient. The communication stack may include public network protocols corresponding to different layers of the communication stack (e.g., a protocol stack for a public network like TCP/IP for the Internet) and/or may include, in some embodiments, private network and/or application specific protocols (e.g., API requests, data schemes for data stores, etc.).

As indicated at 720, an evaluation of the content of one of the layers of the communication stack of the communication may be made as to determine whether a received modification configuration for one of the layers of the communication stack is applicable to the communication, in some embodiments. For example, as discussed above with regard to FIG. 1, modification configurations may identify various features or scenarios in which a modification is to be applied. One (or more) configurable rules in the modification configuration may identify traffic sources (e.g., source network address, submitting client, submitting user account, submitting geographic location), target objects (e.g., data stores, database tables, files, etc.), target applications (e.g., particular services or resources thereof), among other features of the content of a layer under consideration in the communication in order to determine if a modification may be made to the communication. As discussed above with regard to FIGS. 5-6, and below with regard to FIG. 8, some modification rules may involve multi-step logic, considerations, or evaluations (e.g., if the request is a certain type proceed to the next stage, if a random value is selected between a range, then proceed to a third stage evaluating additional criteria, and so on).

As indicated at 730, a modification for the communication may be determined in some scenarios. For example, one class of modification may include a mutation or other change to content of the communication in the portion of the communication corresponding to the layer (e.g., application data changed in the application layer, network data changed in the network layer, etc.). Another class of modification may be a change in processing or handling of the communication (e.g., delays, priority changes, dropping the communication, failing the communication, misdirecting the communication, etc.). Multiple modifications may be applied to one communication in some embodiments (e.g., delays and content changes).

If a modification is determined, then as indicated at 740, the modification may be applied to the communication as part of processing the communication at the proxy. For example, if the modification is a delay, then the process or thread handling the communication at the proxy may suspend for a period of time matching the delay before resuming processing. If the modification is a content change, then an inbound or outbound decorator (e.g., as discussed above) may parse to the appropriate offset within the data of the communication and make the determined change (e.g., corruption change to random values, change in parameter value, such as request type to make the request illegal or invalid, etc.). If a modification is not determined, then as indicated at 750, the communication may be forwarded to the recipient without modification, in some embodiments.

The techniques discussed above with regard to FIG. 7 (and below with regard to FIG. 8) may be applied to different layers of a same communication as configured by different modification configurations for those different layers and/or to different layers of different communications at the same proxy. In this way, a proxy can support different types of failure scenarios, problem scenarios, stress conditions, or other desired scenarios that can be triggered by modifications across different layers of the communication stack.

Figure 8:
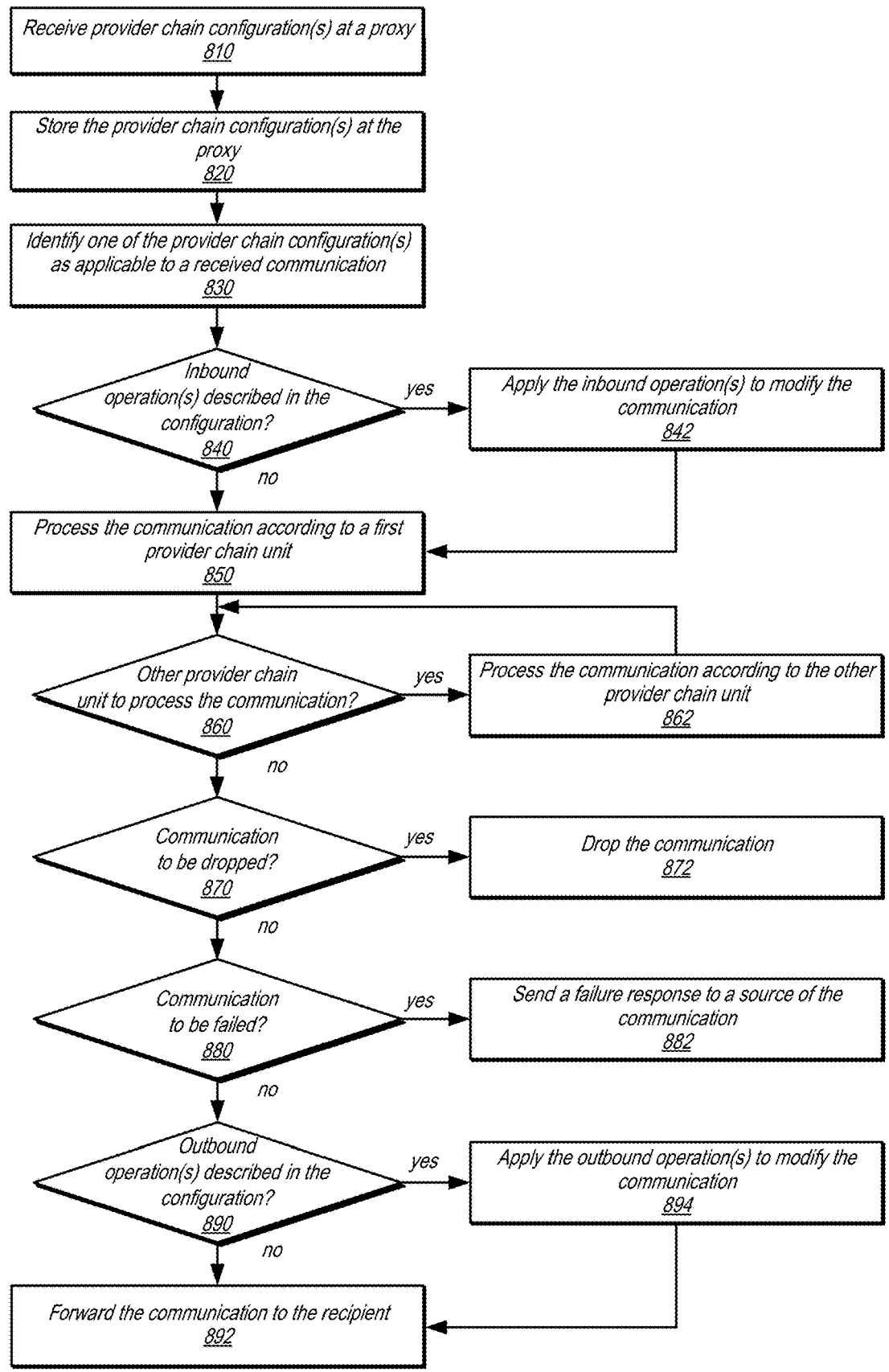
FIG. 8 is a high-level flowchart illustrating various methods and techniques for evaluating a provider chain to perform layer-specific modifications to network communications according to configurable rules at a proxy, according to some embodiments.

FIG. 8 is a high-level flowchart illustrating various methods and techniques for evaluating a provider chain to perform layer-specific modifications to network communications at a proxy, according to some embodiments. As indicated at 810, a provider chain configuration may be received at a proxy, in some embodiments. For example, as discussed above with regard to FIG. 6, an interface for a control plane (or other control interface) of a proxy may support the upload or specification of a provider chain configuration (e.g., as described in a JSON or other document or as described by parameters of an API call to the interface).

As indicated at 820, the provider chain configuration(s) may be stored at the proxy. For example, provider chain configurations may be stored as received in local storage at the proxy server, or may be transformed into a parse or decision tree, workflow, or other representation of the configuration that can be quickly evaluated, loaded, or otherwise applied to incoming communications (e.g., identifying which field, value, parameter, or other portion of content within a layer under consideration is to be evaluated). In some embodiments, the provider chain configuration may be validated before being stored. A list of valid operations for respective layers of a communication stack, for instance, may be used to determine whether the provider chain configuration is executable by the proxy. Links or conditions between different inbound operations, outbound operations, or provider chain units may be checked to ensure that there are no infinite loops or other conditions that would cause a failure if performed. Invalid provider chain configurations may be rejected (e.g., with an error indication that identifies the invalid portions of the provider chain configuration), in some embodiments.

As indicated at 830, one of the provider chain configuration(s) may be identified as applicable to a received communication, in some embodiments. For example, a provider chain configuration may include communication identification criteria in order to evaluate with respect to features of the network communication according to features of the communication that may be visible to the proxy in the content of the communication at the layer specified for the provider chain configuration (e.g., application layer information, such as type of request, network layer information, such as source network address, etc.).

As indicated at 840, a determination may be made as to whether the provider chain configuration describes inbound operations. If so, then as indicated at 842, the inbound operation(s) may be applied to modify the communication. For example, as discussed above, modification of the communication may include modifying the content or performance of the communication (e.g., changing values of one or more fields in the layer of the communication or delaying performance of the communication).

The communication may be processed according to a first provider chain unit, as indicated at 850. For example, the first provider chain unit may determine whether any further operations or processing of the communication is to be performed, such as in the scenario where the first unit of operation may determine that processing of the communication is not to be modified and thus the communication may be forwarded on to a recipient without modification. The first provider chain unit may be evaluated like a root node of a tree or other graph structure, where subsequent provider chain units are further nodes along different branches from the root node in the tree that perform additional processing and/or decision making of the communication. As indicated at 860, if other provider chain units are to process the communication, then the other process units may evaluate and/or process the communication according to the other processing units, as indicated 862, in continuous fashion until no other provider chain unit is to process the communication, as indicated by the negative exit from 860.

As noted above, in addition to (or instead of) modifying the content of a communication, processing of the communication may be modified by the provider chain units, in some embodiments. For example, a provider chain unit may indicate that the communication is to be dropped (e.g., to simulate a loss of the communication between a source and recipient), and thus as indicated by the negative exit from 870, the communication may be dropped, as indicated at 872, in some scenarios. In another scenario, a provider chain unit may determine whether the communication is to be failed, as indicated at 880. If so, a failure response may be sent to a source of the communication, as indicated at 882. In this way, failures or other error indications may be injected into the interactions between the source and recipient.

Similar to the inbound operations discussed above, a determination may be made as to whether the provider chain configuration describes outbound operations, as indicated at 890. If so, then as indicated at 894, the outbound operation(s) may be applied to modify the communication. For example, as discussed above, modification of the communication may include modifying the content or performance of the communication (e.g., corrupting data values in one or more fields in the layer).

As indicated at 892, the communication may be forwarded to the recipient, in some embodiments. For example, the communication may be sent to a next hop address in the network in order to propagate the communication through the network to the recipient's network address.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
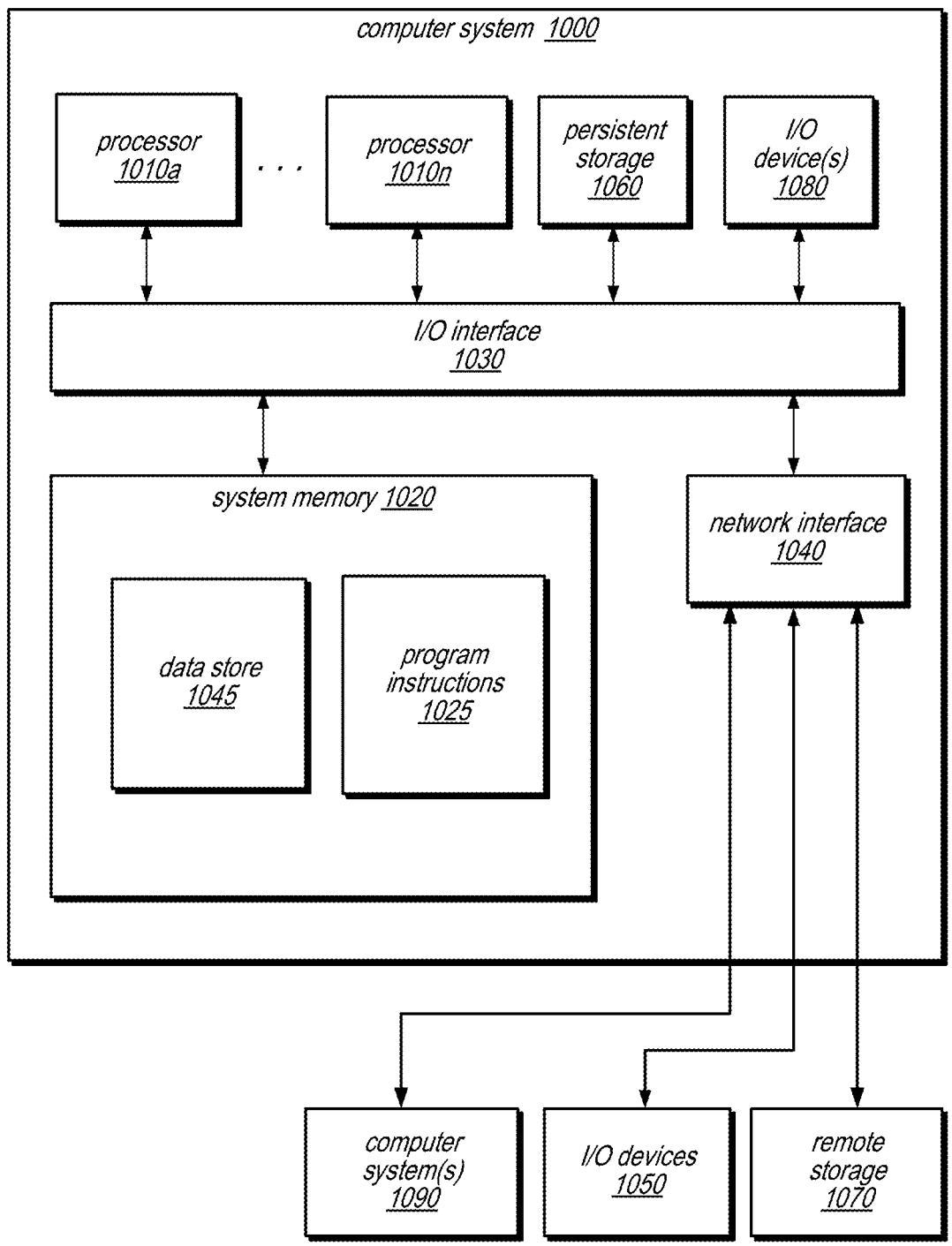
FIG. 9 is a block diagram illustrating an example computing system, according to some embodiments.

Embodiments of layer-specific modifications to network communications at a proxy may be executed on one or more computer systems, which may interact with various other devices. FIG. 9 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the data warehouse system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a multi-tenant provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a network interface;
 at least one processor; and
 a memory, storing program instructions that when executed by the at least one processor cause the at least one processor to implement a proxy;
 the proxy, configured to:
  receive, via the network interface:
   a modification configuration of a plurality of different modification configurations for modifying a single layer of a plurality of layers of a communication, wherein the plurality of layers is included in a communication stack supported by the proxy, and
   a selection of one layer of the plurality of layers for applying the modification configuration, wherein respective modification configurations of the plurality of different modification configurations are configured to be applied to the plurality of layers;
  receive, via the network interface, the communication, wherein the communication is generated by a client to be transmitted to an application according to the communication stack, and wherein the communication comprises a network-based service request to implement one or more service functions for at least one of the client or the application;
  determine that the modification configuration is to be applied to the one layer of the plurality of layers of the communication based on the selection of the one layer of the plurality of layers;
  evaluate content of the communication at the one layer of the plurality of layers in the communication stack to determine that a modification to the communication is applicable at the one layer of the plurality of layers in the communication stack and according to the received modification configuration; and
  apply the modification to the one layer of the plurality of layers of the communication as part of processing the communication at the proxy based on the evaluation of the content of the communication.

2. The system of claim 1, wherein the proxy is further configured to:
- receive, via the network interface, an update to the modification configuration;
- receive, via the network interface, another communication;
- evaluate content of the other communication at the one layer of the layers of the communication stack to determine that another modification to the other communication at the one layer of the communication stack is applicable according to the updated modification configuration; and
- apply the other modification to the other communication as part of processing the communication at the proxy, wherein the other modification to the other communication is different than the modification to the communication.

3. The system of claim 1, wherein the network interface, the processor, and the memory that implement the proxy are included in a networking device that implements a provider network, wherein the application is hosted by a service of the provider network, and wherein the modification configuration is received via an interface for proxy modification service that provides the modification configuration to the networking device.

4. The system of claim 1, wherein the network interface, the processor, and the memory that implement the proxy are included in a proxy server implemented in response to a request to a proxy modification service of a provider network to deploy the proxy and wherein the application is hosted by a service of the provider network.

5. A method, comprising:
- receiving, over a network at a proxy:
  - a modification configuration of a plurality of different modification configurations for modifying a single layer of a plurality of layers of a communication, wherein the plurality of layers is included in a communication stack supported by the proxy, and
  - a selection of one layer of a plurality of layers for applying a modification according to the modification configuration, wherein respective modification configurations of the plurality of different modification configurations are configured to be applied to the plurality of layers;
- receiving, over the network at the proxy, a communication, wherein the communication is generated by a source to be transmitted to a recipient according to the communication stack comprising the plurality of layers, and wherein the communication comprises a network-based service request to implement one or more functions for at least one of a client or an application;
- determining, by the proxy, that the modification is to be applied to the one layer of the plurality of layers based on the selection of the one layer of the plurality of layers;
- evaluating, by the proxy, content of the communication at the one layer of the plurality of layers of the communication stack to determine that the modification to the communication is applicable at the one layer of the plurality of layers in the communication stack and according to the modification configuration for the one layer of the communication stack received at the proxy; and
- applying, by the proxy, the modification to the one layer of the plurality of layers of the communication as part of processing the communication at the proxy based on the evaluation of the content of the communication.

6. The method of claim 5, wherein the recipient is an application service hosted in a provider network, and wherein the method further comprises:
- receiving, at a control plane of a proxy modification service of the provider network, a request to deploy the proxy between a programmatic interface service and the application service; and
- deploying the proxy as a proxy server to receive communications from the programmatic interface service, including the communication, bound for the application service.

7. The method of claim 5, wherein the recipient is an application hosted in a provider network, and wherein the method further comprises:
- receiving, at a control plane of a proxy modification service of the provider network, a request to deploy the proxy between:
  - a network endpoint that points to the application, and
  - the application; and
- deploying the proxy as a proxy server to receive communications directed to the network endpoint, including the communication, that are bound for the application.

8. The method of claim 5, further comprising:
- receiving, at the proxy, the modification configuration for the one layer of the communication stack; and
- storing, by the proxy, the modification configuration for subsequent application by the proxy.

9. The method of claim 5, further comprising:
- receiving another communication over the network at the proxy;
- determining, by the proxy, that another modification to the other communication corresponding to the one layer of the communication stack is not applicable; and
- forwarding, by the proxy, the communication to the recipient.

10. The method of claim 5, wherein applying the modification to the communication as part of processing the communication at the proxy comprises changing content of at least a portion of the communication.

11. The method of claim 5, wherein applying the modification to the communication as part of processing the communication at the proxy comprises dropping the communication.

12. The method of claim 5, further comprising:
- receiving, over the network at the proxy, another communication;
- evaluating, by the proxy, content of the other communication at a different one of the layers of the communication stack to determine that another modification to the other communication at the different one of the layers of the communication stack is applicable according to a different modification configuration for the different layer of the communication stack received at the proxy; and
- applying, by the proxy, the other modification to the other communication as part of processing the other communication at the proxy.

13. The method of claim 5, further comprising:
- receiving, at the proxy, an update to the modification configuration;
- applying, by the proxy, the update to the modification configuration;
- receiving, over the network at the proxy, another communication;
- evaluating, by the proxy, content of the other communication at the one layer of the layers of the communication stack to determine that another modification to the other communication at the one layer of the communication stack is applicable according to the updated modification configuration; and applying, by the proxy, the other modification to the other communication as part of processing the other communication at the proxy, wherein the other modification to the other communication is different than the modification to the communication.

14. One or more non-transitory, computer-readable storage media, storing program instructions that when executed on or across one or more computing devices cause the one or more computing devices to implement:

receiving, over a network at a proxy:
a modification configuration of a plurality of different modification configurations for modifying a single layer of a plurality of layers of a communication, wherein the plurality of layers is included in a communication stack supported by the proxy, and
a selection of one layer of a plurality of layers for applying a modification according to the modification configuration, wherein respective modification configurations of the plurality of different modification configurations are configured to be applied to the plurality of layers;

receiving, over the network at the proxy, a communication, wherein the communication is generated by a source to be transmitted to a recipient according to the communication stack comprising the plurality of layers, and wherein the communication comprises a network-based service request to implement one or more service functions for at least one of a client or an application;

determining, by the proxy, that the modification is to be applied to the one layer of the plurality of layers based on the selection of the one layer of the plurality of layers;

evaluating, by the proxy, content of the communication at the one layer of the plurality of layers of the communication stack to determine that the modification to the communication is applicable at the one layer of the plurality of layers in the communication stack and according to one or more rules included in a modification configuration for the one layer of the communication stack configured via an interface to the proxy; and applying, by the proxy, the modification to the one layer of the plurality of layers of the communication as part of processing the communication at the proxy based on the evaluation of the content of the communication.

15. The one or more non-transitory, computer-readable storage media of claim 14, wherein the recipient is one of a plurality of instances of an application hosted in a provider network, and wherein the one or more non-transitory, computer-readable storage media store additional program instructions that when executed by the one or more computing devices cause the one or more computing devices to implement:

receiving, at a control plane of a proxy modification service of the provider network, a request to deploy the proxy between a load balancer in the provider network that distributes communications amongst the plurality of instances of the application; and deploying the proxy as a proxy server to receive communications directed to the plurality of instances of the application, including the communication, from the load balancer.

16. The one or more non-transitory, computer-readable storage media of claim 14, further storing additional program instructions that when executed by the one or more computing devices cause the one or more computing devices to implement:

receiving, at the proxy, the modification configuration for the one layer of the communication stack; and
storing, by the proxy, the modification configuration for subsequent application by the proxy.

17. The one or more non-transitory, computer-readable storage media of claim 16, wherein the one or more rules included in the modification configuration correspond to one or more features of a provider chain.

18. The one or more non-transitory, computer-readable storage media of claim 14, wherein, in applying the modification to the communication as part of processing the communication at the proxy, the program instructions cause the one or more computing devices to implement sending a response indicating a failure of the communication to the source.

19. The one or more non-transitory, computer-readable storage media of claim 14, further storing additional program instructions that when executed by the one or more computing devices cause the one or more computing devices to implement:

receiving, at the proxy, an update to at least one of the one or more rules included in the modification configuration;
applying, by the proxy, the update to the at least one rules in the modification configuration;
receiving, over the network at the proxy, another communication;
evaluating, by the proxy, content of the other communication at the one layer of the layers of the communication stack to determine that another modification to the other communication at the one layer of the communication stack is applicable according to according to the updated rule included in the modification configuration; and
applying, by the proxy, the other modification to the other communication as part of processing the other communication at the proxy, wherein the other modification to the other communication is different than the modification to the communication.

20. The one or more non-transitory, computer-readable storage media of claim 14, wherein, in applying the modification to the communication as part of processing the communication at the proxy, the program instructions cause the one or more computing devices to implement delaying processing of the communication at the proxy.

* * * * *